(12) United States Patent
Whitehouse et al.

(10) Patent No.: US 11,610,608 B1
(45) Date of Patent: Mar. 21, 2023

(54) FILM RECORDING SYSTEMS FOR PERSONALIZED IMAGES

(71) Applicant: Projectagram LLC, San Francisco, CA (US)

(72) Inventors: Gordon Randolph Whitehouse, San Francisco, CA (US); Guy Shahine, San Francisco, CA (US)

(73) Assignee: Projectagram LLC, San Francisco, CA (US)

( * ) Notice: Subject to any disclaimer, the term of this patent is extended or adjusted under 35 U.S.C. 154(b) by 0 days.

(21) Appl. No.: 17/172,875

(22) Filed: Feb. 10, 2021

(51) Int. Cl.
| | | |
|---|---|---|
| *G11B 27/06* | (2006.01) | |
| *G03B 21/20* | (2006.01) | |
| *G11B 27/036* | (2006.01) | |
| *G11B 27/032* | (2006.01) | |

(52) U.S. Cl.
CPC .......... *G11B 27/06* (2013.01); *G03B 21/2006* (2013.01); *G11B 27/032* (2013.01); *G11B 27/036* (2013.01)

(58) Field of Classification Search
CPC ..... G11B 27/06; G11B 27/032; G11B 27/036; G03B 21/2006
USPC .......................................................... 348/97
See application file for complete search history.

(56) References Cited

U.S. PATENT DOCUMENTS

| | | | | |
|---|---|---|---|---|
| 4,739,396 A | * | 4/1988 | Hyatt ................. | G11C 16/3431 348/766 |
| 5,926,255 A | * | 7/1999 | Kimura .............. | G03B 27/6285 355/39 |
| 8,285,131 B1 | * | 10/2012 | Myatt ................. | G02B 26/0808 396/20 |
| 2006/0122908 A1 | * | 6/2006 | Sailus ................ | G06Q 30/0633 705/26.8 |
| 2006/0262137 A1 | * | 11/2006 | Lempp ................ | G06F 3/1446 345/619 |
| 2008/0231714 A1 | * | 9/2008 | Estevez .............. | G03B 17/00 348/208.7 |
| 2009/0319392 A1 | * | 12/2009 | Baum ................. | G03D 15/005 705/26.1 |
| 2010/0150475 A1 | * | 6/2010 | Holland .............. | G06T 3/4007 382/300 |
| 2016/0345066 A1 | * | 11/2016 | Barker ................ | H04N 21/2743 |
| 2016/0379094 A1 | * | 12/2016 | Mittal ................ | G06V 10/50 382/224 |

(Continued)

FOREIGN PATENT DOCUMENTS

| | | | | |
|---|---|---|---|---|
| CN | 206103352 U | * | 4/2017 | |
| CN | 109348279 A | * | 2/2019 | ......... H04N 21/4331 |

*Primary Examiner* — Loi H Tran
(74) *Attorney, Agent, or Firm* — Scale LLP

(57) ABSTRACT

Systems and methods for recording personalized digital images on film are described. In some embodiments, a system may include a length of film, a film recorder, and a server. The system may be configured to record in a first frame of the length of film one or more digital images associated with a first user. The system may further be configured to record in a second frame of the length of film one or more digital images with a second user. As a result, the length of film may include a plurality of frames having respective sets of images, or renderings thereof, associated with respective users, and at least two frames of the length of film may include sets of images, or renderings thereof, associated with respective users that are different from one-another.

17 Claims, 6 Drawing Sheets

(56) References Cited

U.S. PATENT DOCUMENTS

2020/0186695 A1* 6/2020 Helweg-Larsen .......................... H04N 5/232939

* cited by examiner

FILM RECORDING SYSTEMS FOR PERSONALIZED IMAGES

FIELD OF THE DISCLOSURE

This disclosure relates to film recording systems and methods. More specifically, this disclosure relates to systems and methods that can be used to cost-effectively produce film that can be used to project personalized images.

BACKGROUND

Film recording has been used in the movie industry to create projectable copies of film reels. For example, a producer may distribute digital copies of a movie to theaters. A theater may then use a film recorder to transfer the digital images to a reel of photographic film, so that the movie can then be projected using a projector and played for an audience. As many theaters have now acquired projectors that are capable of playing movies from the digital source material, film recorders are used increasingly infrequently and are thought by many to be nearing obsolescence in a digital world.

At present, there is no adequate solution for creating personalized projectable images in a cost-effective way. Film recorders are used to record movies from singular digital sources, and they have not been used to create small-batch, personalized images. Digital projectors, meanwhile, are too expensive to be used in many consumer goods, particularly novelties such as children's toys.

Accordingly, there is a need for methods for cost-effectively creating personalized projectable images. Further, there is a need for cost-effective systems that can be used to project personalized projectable images.

SUMMARY

The following description presents a simplified summary in order to provide a basic understanding of some aspects described herein. This summary is not an extensive overview of the claimed subject matter. It is intended to neither identify key or critical elements of the claimed subject matter nor delineate the scope thereof.

In some embodiments, a system for recording personalized digital images on film may be provided. In some embodiments, the system may include a length of film, a film recorder configured to transfer digital images to photographic film, and a server configured to receive a plurality of sets of digital images. Each set of digital images may be associated with a respective user, and the plurality of sets of digital images may include a first set of digital images associated with a first user and a second set of digital images associated with a second user. In some embodiments, the system may be configured to record, using the film recorder, in a first frame of the length of film one or more digital images, or renderings thereof, of the first set of digital images associated with the first user. The system may be further configured to record, using the film recorder, in a second frame of the length of film one or more digital images, or renderings thereof, of the second set of digital images associated with the second user. After the film recorder has recorded the one or more digital images, or renderings thereof, of the first and second sets of digital images, the length of film may include a plurality of frames, wherein each frame of the plurality of frames comprises a respective set of images, or renderings thereof, received by the server and associated with a respective user. At least two frames of the plurality of frames comprise sets of images, or renderings thereof, associated with respective users may be different from one-another.

In some embodiments, a film-based personalized image system may include a user equipment (UE), a projector including a light source, and a film section configured to be disposed within the projector such that one or more projected images may be projected by passing light from the light source through the film section. In some embodiments, the film section may be produced by transmitting, using the UE, an instruction which causes a server to receive first set of digital images associated with a first user to a server. The film section may further be produced by recording, using a film recorder, in a first frame of a length of film one or more digital images, or renderings thereof, of the first set of digital images. The film section may further be produced by recording, using the film recorder, in a second frame of a length of film one or more digital images, or renderings thereof, of a second set of digital images associated with a second user. After the film recorder has recorded the one or more digital images, or renderings thereof, of the first and second sets of digital images, the length of film may include a plurality of frames. Each frame of the plurality of frames may include a respective set of images, or renderings thereof, received by the server and associated with a respective user. In some embodiments, at least two frames of the plurality of frames may include sets of images, or renderings thereof, associated with respective users that are different from one-another.

In some embodiments, a film-based personalized image projection system may include a UE, a projector including a light source, and a first film section configured to be disposed within the projector such that a first plurality of projected images may be selectively projected by passing light from the light source through the first film section. In some embodiments, the first film section comprising renderings of a first plurality of digital images. In some embodiments, the first film section may be produced using a manufacturing method including transmitting, using the UE, an instruction which causes a server to receive the first plurality of digital images; and using a film recorder, recording in a first frame of a length of film a first plurality of digital images, or renderings thereof, of the set of digital images received based on the instruction transmitted using the UE.

In some embodiments, a method for recording personalized digital images on film may include receiving, using a server, a plurality of sets of digital images, each set of digital images being associated with a respective user, the plurality of sets of digital images comprising a first set of digital images associated with a first user and a second set of digital images associated with a second user. The method may further include generating a first digital composite image comprising renderings of at least two digital images of the first set of digital images. The method may include generating a second digital composite image comprising renderings of at least two digital images of the second set of digital images. The method may include recording, using a film recorder, the first digital composite image in a first frame of a length of film, and recording, using the film recorder, the second digital composite image in a second frame of the length of film. After the film recorder has recorded the first composite image and the second composite image, the length of film may include a plurality of frames. Each frame of the plurality of frames may include a respective set of images, or renderings thereof, received by the server and associated with a respective user. In some embodiments, at least two frames of the plurality of frames may include sets of images, or renderings thereof, associated with respective users that are different from one-another.

Further variations encompassed within the systems and methods are described in the detailed description of the invention below.

BRIEF DESCRIPTION OF THE DRAWINGS

The accompanying drawings, which are incorporated herein and form part of the specification, illustrate various, non-limiting embodiments of the present invention. In the drawings, like reference numbers indicate identical or functionally similar elements.

DETAILED DESCRIPTION

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or embodiments so described and illustrated.

Figure 1:
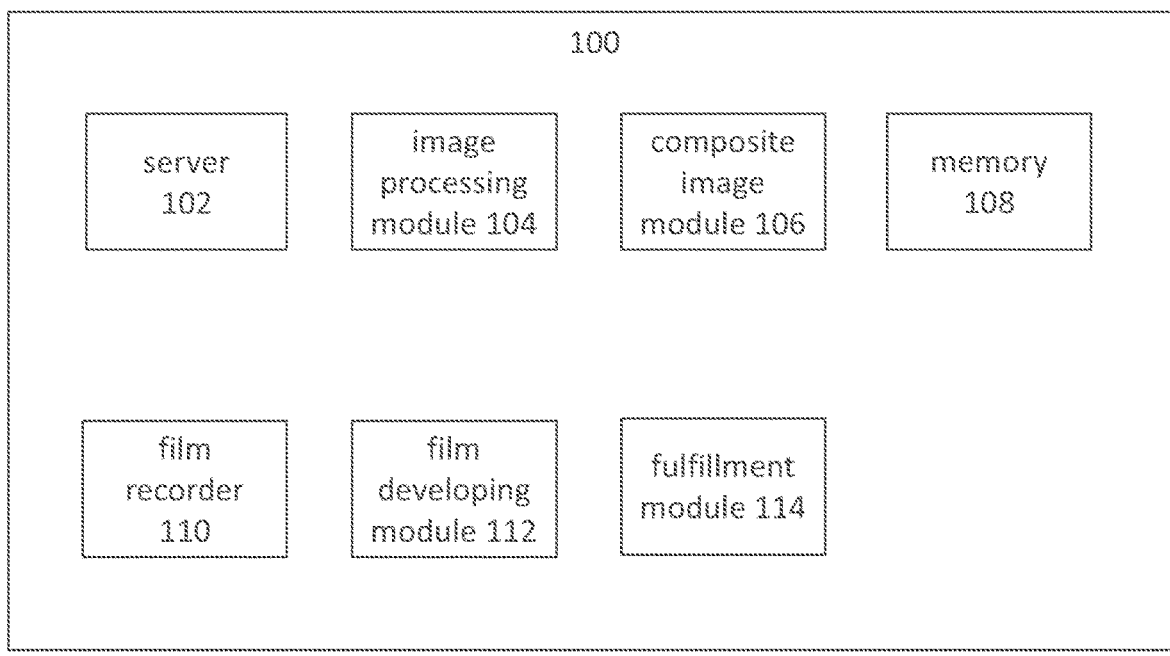
FIG. 1 shows an exemplary system recording personalized digital images on film.

FIG. 1 shows an exemplary system 100 recording personalized digital images on film. In some embodiments, the system may include one or more of a server 102, and image processing module 104, a composite image module 106, a memory 108, a film recorder 110, a film developing module 112, and a fulfillment module 114.

The server 102 may be configured to receive sets of digital images. The digital images sets may be received directly or indirectly from one or more users. For example, a user may upload one or more images to the server 102 from a user equipment (UE), the user may transmit an instruction to the server 102 which then causes the server 102 to obtain the one or more images from another source (e.g., a cloud-based storage system), or the user may transmit an instruction to another system (e.g., a cloud-based storage system, or a third party website to which the user has uploaded images or which is otherwise in possession of images in which the user is interested) which may transmit the one or more images to the server 102. In some embodiments, the server 102 may be configured to receive a first set of digital images associated with a first user and a second set of digital images associated with a second user.

Image processing module 104 may be configured to process digital images received from users. For example, image processing module 104 may make adjustments to images to ensure that they are optimized to be incorporated into a composite image and recorded on film, as described below with respect to FIG. 3. Exemplary adjustments may include cropping, rotating, or changing the scale of the images. Image parameters such as brightness and contrast may also be modified, as described below with respect to FIGS. 4 and 5. Other image modifications or enhancements may be applied, depending on user instructions or preferences. For example, images may be filtered or sharpened, colors may be modified, image backgrounds may be substituted, or faces may be cropped and then superimposed on stock images.

In some embodiments, composite image module 106 may be configured to generate one or more composite images based on sets of images received from users. An exemplary method for generating and storing composite images is described in greater detail with respect to FIG. 3. In some embodiments, the generated composite images may be stored in a memory 108.

In some embodiments, film recorder 110 may be configured to record images in one or frames of a length of film. For example, the film recorder 110 may accept as inputs one or more digital images (which may optionally be composite images generated by the composite image module 106) and one or more lengths of film, and it may output one or more lengths of film on which the images are recorded. Commercially available film recorders are suitable for use in the present invention.

In some embodiments, film developing module 112 may be configured to develop film output from film recorder 110. Film may be developed using chemical processes known to those of skill in the art.

Figure 6:
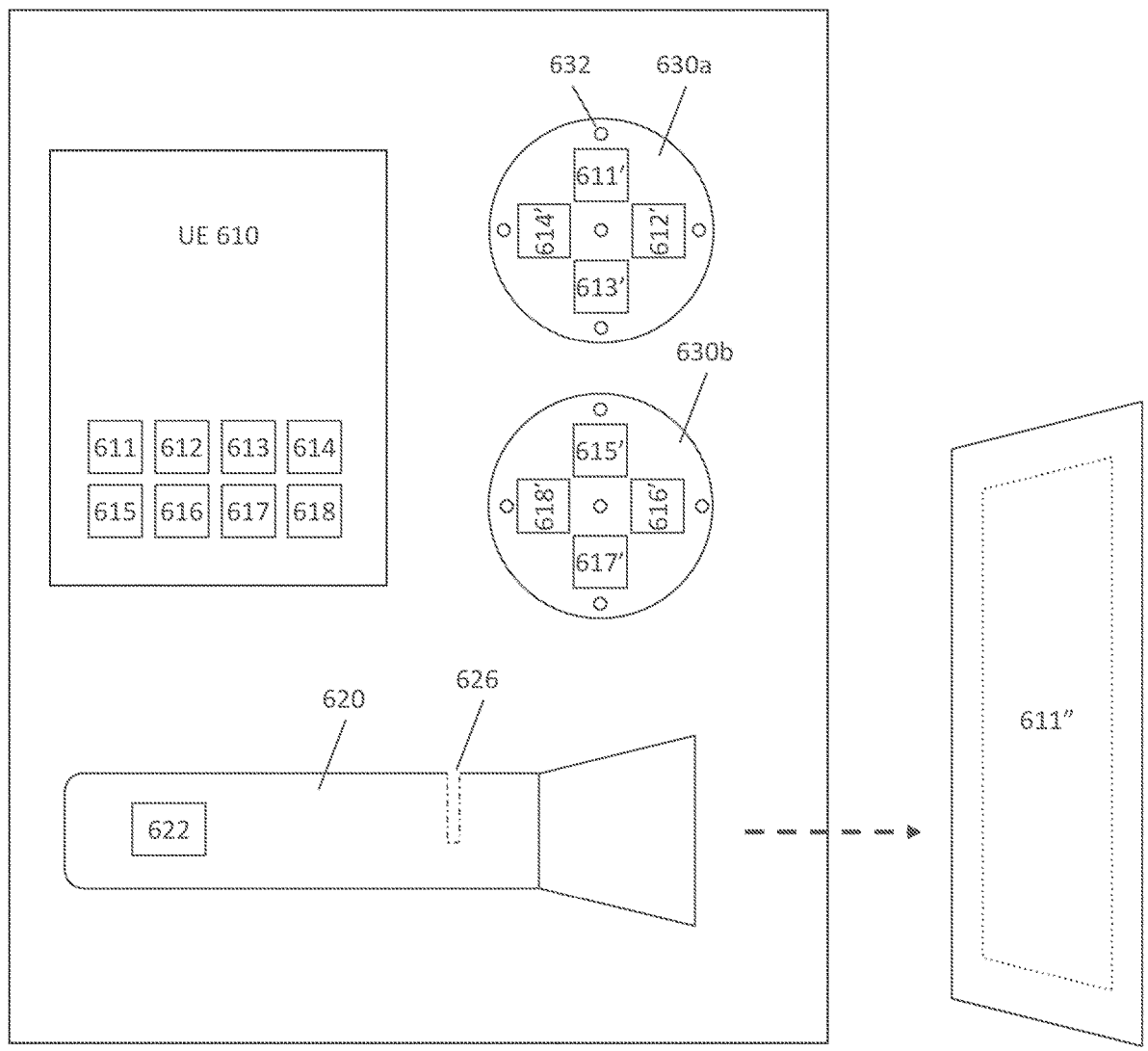
FIG. 6 shows an exemplary film-based personalized image projection system.

In some embodiments, fulfillment module 114 may process the developed film into units suitable for delivery to a user. For example, in embodiments where the film is intended for use in personalized image projection systems such as those described with respect to FIG. 6, fulfillment module 114 may cut one or more film sections from the frames of a length of film. For example, the fulfillment module 114 may include a die for cutting film sections from a length of film. In some embodiments, the film sections may then be placed within casings to produce slides (which may optionally be rotatable), as shown in FIG. 6. The slides may then be packaged and delivered to a user.

Figure 2:
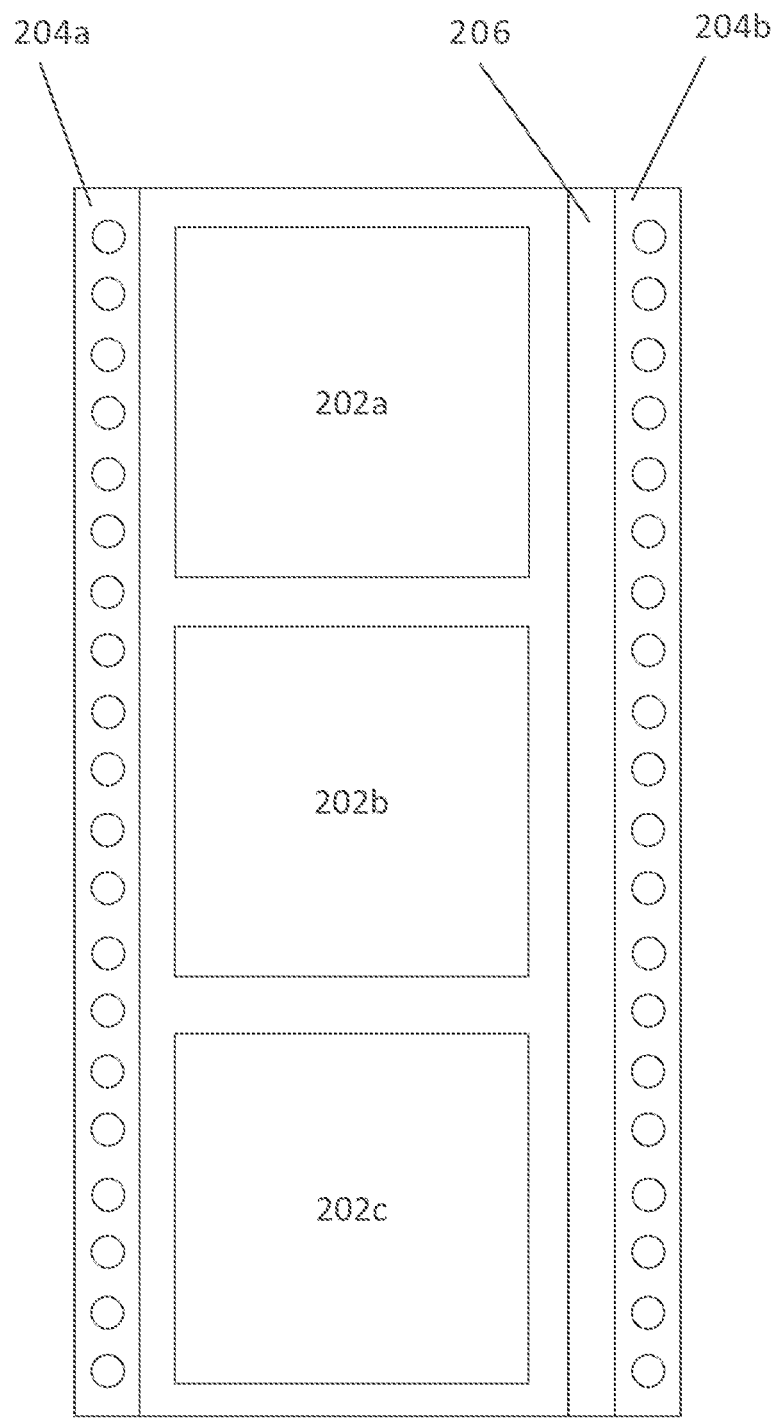
FIG. 2 shows an exemplary length of film.

FIG. 2 shows an exemplary length of film 200. The length of film 200 may include one or more frames 202a, 202b, 202c. The length of film 200 may also include tracks 204a, 204b which may be used to control movement of the film 200 with gears. The length of film may also include a strip 206, which may be used to record non-image information. In some embodiments, the film recorder 110 may record information onto strip 206 that may be used by fulfillment module 114 to process and deliver finished units to users. For example, strip 206 may include information indicating users with whom images recorded in the frames 202a, 202b, 202c are associated. For example, a portion of strip 206 that is adjacent to frame 202a may contain information indicating a user with whom the image in frame 202a is associated, a portion of strip 206 that is adjacent to frame 202b may contain information indicating a user with whom the image in frame 202b is associated, and so on. In some embodiments, this information may be a bar code or QR code. In other embodiments, the non-image information may indicate to a fulfillment module where to cut film sections from the section of film. For example, an indicator on strip 206 may indicate that a die should make a cut a certain distance or time after the indicator is read.

Figure 3:
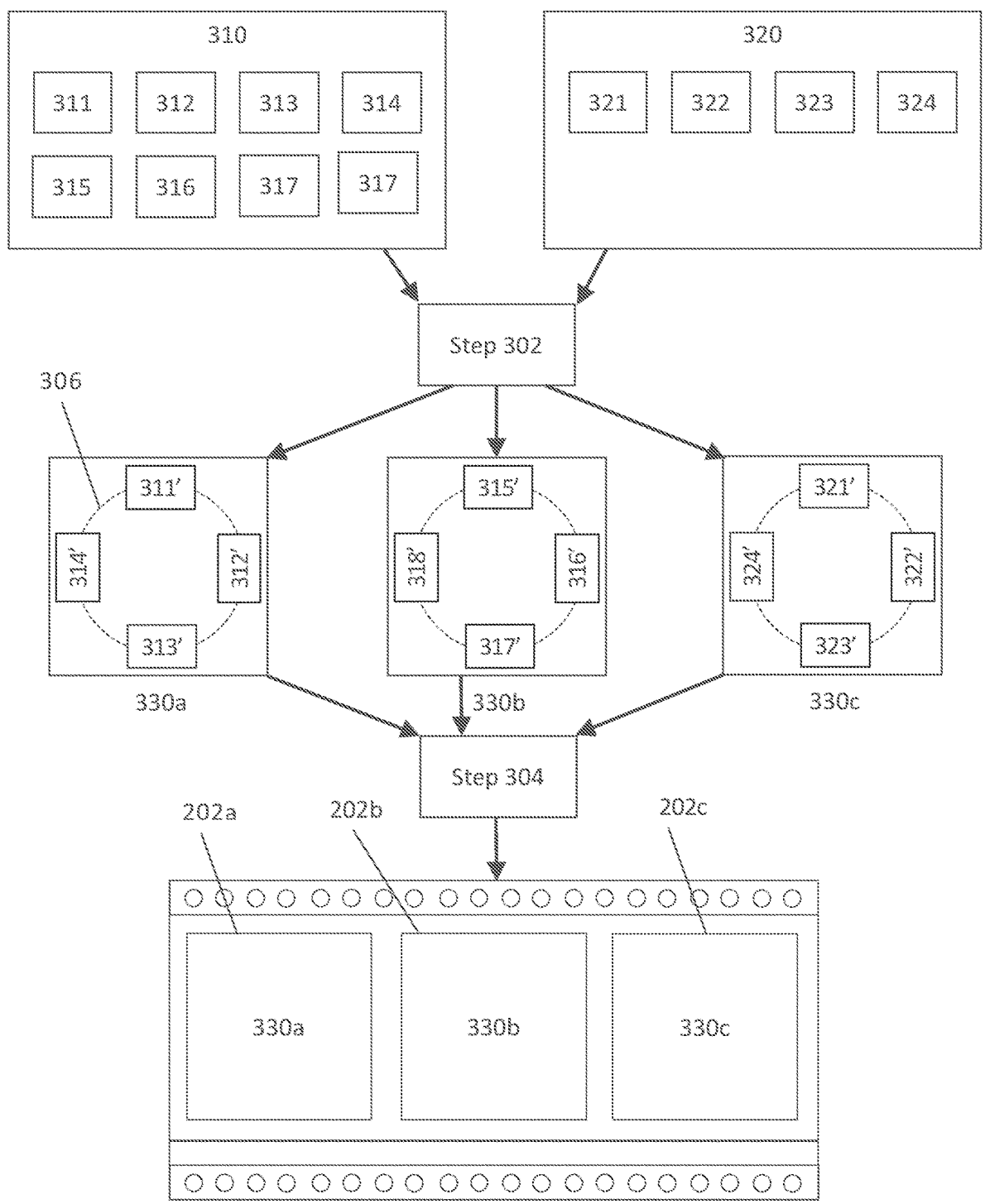
FIG. 3 shows an exemplary method for generating and recording composite images.

FIG. 3 shows an exemplary method for generating and recording composite images. In some embodiments, a first set of images 310 may be associated with a first user. The first set of images 310 may include any number of images. For illustrative purposes, the first set 310 is shown including eight images 311-318. A second set of images 320 may be associated with a second user 320. The second set 320 may also include any number of images, and it is shown for illustrative purposes with four images 321-324. Any number of sets of images may be associated with any number of users. For example, the system could receive three, four, five, hundreds, or thousands of sets of images. The sets of images may be received by a server, as described with respect to FIGS. 1, 4, and 5.

In step 302, the images may be in sets 310, 320 may be processed and combined in composite images. For example, renderings 311', 312', 313', 314' of images 311, 312, 313, 314 may be arranged in a single composite image, which may then be stored in memory. In some embodiments, the renderings may be lower-resolution versions of the original images. In some embodiments, the renderings in a composite image may be placed in a circular arrangement 306. Although four renderings are shown in the composite images in FIG. 3, any number of renderings may be provided. For example, one, two, three, four, six, eight, ten, twelve, sixteen, or renderings may be included in a composite image (or on a film section/slide In some embodiments, a single set of images associated with a user may be divided into multiple composite images. For example, renderings 311', 312', 313', 314' (which correspond to images 311, 312, 313, 314) may be arranged in composite image 330a, and renderings 315', 316', 317', 318' (which correspond to images 315, 316, 317, 318) may be arranged in composite image 330b. In other cases, all of the images of a set may be arranged in a single composite image. For example, renderings 321', 322', 323', 324' (which correspond to images 321, 322, 323, 324) may be arranged in composite image 330c. The images may be sorted and arranged in composite images based on instructions provided by users. In other embodiments, the composite image module may make these determinations based parameters or detected relationships between images.

Any number of composite images may be generated based on images received from any number of users. For example, for each of a plurality of users from whom a set of digital images is received by the server, the system may generate a respective composite image including respective renderings of two or more digital images of the respective set of digital images associated with the respective user. Optionally, the renderings in each respective composite image may be arranged in circular arrangements.

In step 304, the composite images may be recorded on a length of film. For example, composite image 330a may be recorded in a first frame 202a of the length of film, composite image 330b may be recorded in a second frame 202b of the length of film, and composite image 330c may be recorded in a third frame 202c of the length of film. Any number of composite images may be recorded in a length of film. This process may produce a length of film having multiple frames, in which images associated with multiple users are recorded in different frames of the length of film. For example, the length of film may include a plurality of frames, wherein each frame of the plurality of frames includes a respective set of images, or renderings thereof, received by the server and associated with a respective user, and at least two frames of the plurality of frames include sets of images, or renderings thereof, associated with respective users that are different from one-another.

Figure 4:
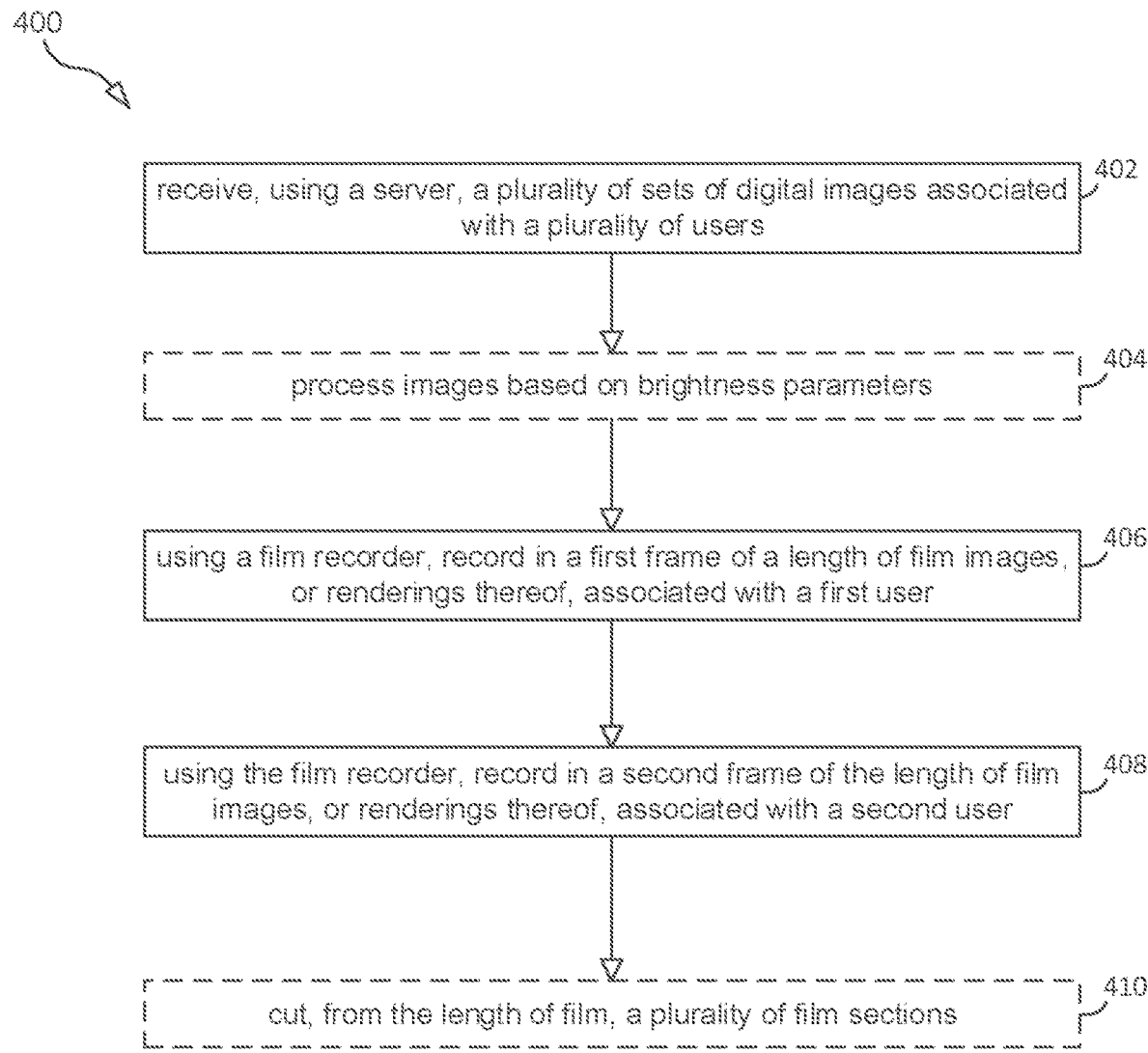
FIG. 4 shows an exemplary method for recording personalized images.

FIG. 4 shows an exemplary method 400 for recording personalized images. In step 402, a server may receive a plurality of sets of digital images associated with a plurality of users. As discussed above with respect to FIG. 3, any number of sets of images associated with any number of users may be received. In some embodiments, a first set of images may be associated with a first user, and a second set of images may be associated with a second user. In some embodiments, the sets of images may be transmitted to the server based on an instruction provided by a user. For example, a user may upload one or more images to the server 102 from a user equipment (UE), the user may transmit an instruction to the server 102 which then causes the server 102 to obtain the one or more images from another source (e.g., a cloud-based storage system), or the user may transmit an instruction to another system (e.g., a cloud-based storage system, or a third party website to which the user has uploaded images or which is otherwise in possession of images in which the user is interested) which may transmit the one or more images to the server 102.

In step 404, the system may optionally process one or more of the received images based on respective brightness parameters of the images. In some embodiments, other image parameters, such as contrast parameters, may be used in addition to or as an alternative to brightness parameters. As discussed below, the system may be configured to record on film digital images received from users using one or more exposure parameters. The recorded images on the film may then be used to project renderings of the digital images received from the users. The quality of the projected renderings may be improved by processing the images before they are recorded (as per step 404), by adjusting an exposure parameter (e.g., of a film recorder), and/or by adjusting the developing procedure (e.g., by lengthening the time that the film is subjected to chemicals used for developing the film, or by changing the composition of the chemicals to which the film is subjected).

To improve the projected image, an uploaded image may be evaluated in the context of external factors affecting the projected image output quality: the brightness of the lamp, distance the image will be projected, ambient light, lens throw, and lens quality. These variables may generally be estimated based on an expected use scenario, such as where the images will be projected using a predetermined type of projector. In some embodiments, the system may analyzes each image to create a digital map of its image properties: color, brightness, contrast, vibrance, saturation, sharpness, etc. values. The system may further evaluate the generated maps against a series of tuning rules, which may developed to produce quality slide images. These rules may be tuned based on an expectation that the images will be projected using a projector having a low-power light. These rules may adjust the image property values small amounts so that the intent of the image remains, but delivers a higher quality output. For example, dark photos generally require a high powered light source to be seen correctly. Where an image is detected to have low brightness or significant shadows, the system may increase the brightness of the image (or rendering)—before it is recorded on film—to compensate for the expected light source. As an alternative or in addition, an exposure parameter used for the recording procedure may be increased, such that the film is exposed to a greater amount of light, which may brighten the rendering as recorded on film, thereby improving the resulting image when it is projected with a low-power light source. In another example, if a film is detected to be a softer image medium, the system add sharpness to the image (or rendering)—before it is recorded on film—to reduce the perceived resolution loss vs. digital screens.

A preferred method, shown in step 404, may be performed by detecting a brightness parameter of each image. Based on the detected brightness parameter, the brightness of the image may be adjusted upward or downward before it is integrated into a composite image (as per step 406). This adjustment may be made based on a common exposure parameter that will be used for all of the image renderings in a single composite image, all of the composite images to be recorded in a single length of film, or for all of the composite images to be recorded over many lengths of film. For example, a single uniform exposure parameter may be used continuously during manufacturing, and the image processing steps may be optimized based on this static parameter. Likewise, film developing parameters may also be held constant, which may allow the image processing steps to be optimized based on this static information.

In some embodiments, a first group of images may be processed such that they are optimized to be recorded using a first exposure parameter, and a second group of images may be processed such that they are optimized to be recorded using a second exposure parameter. In some embodiments, groups of images that are optimized for common exposure parameters may be recorded in common frames. For example, the first group of images may be recorded in a first frame, and a second group of images may be recorded in a second frame. In some embodiments, a plurality of images from different users may be processed prior to recording such that the images are optimized to be recorded using a uniform exposure parameter. For example, the first exposure parameter may be identical to the second exposure parameter.

In step 406, one or more images, or renderings thereof (e.g., a composite image comprising renderings of multiple images), may be recorded in a first frame of a length of film. The images or renderings recorded in the first frame may be associated with a first user. In step 408, one or more images, or renderings thereof (e.g., a composite image comprising renderings of multiple images), may be recorded in a second frame of a length of film. The images or renderings recorded in the second frame may be associated with a second user. Steps 406 and 408 may be performed using a film recorder, as described above with respect to FIG. 1. Additional images or renderings associated with other users may be recorded in subsequent frames of the length of film.

In step 410, a plurality of film sections may optionally be cut from the length of film. In some embodiments, step 410 may be performed by fulfillment module 114, as described above with respect to FIG. 1. Optionally, the film sections may then be enclosed in casings to produce slides, as described above with respect to FIG. 1.

Figure 5:
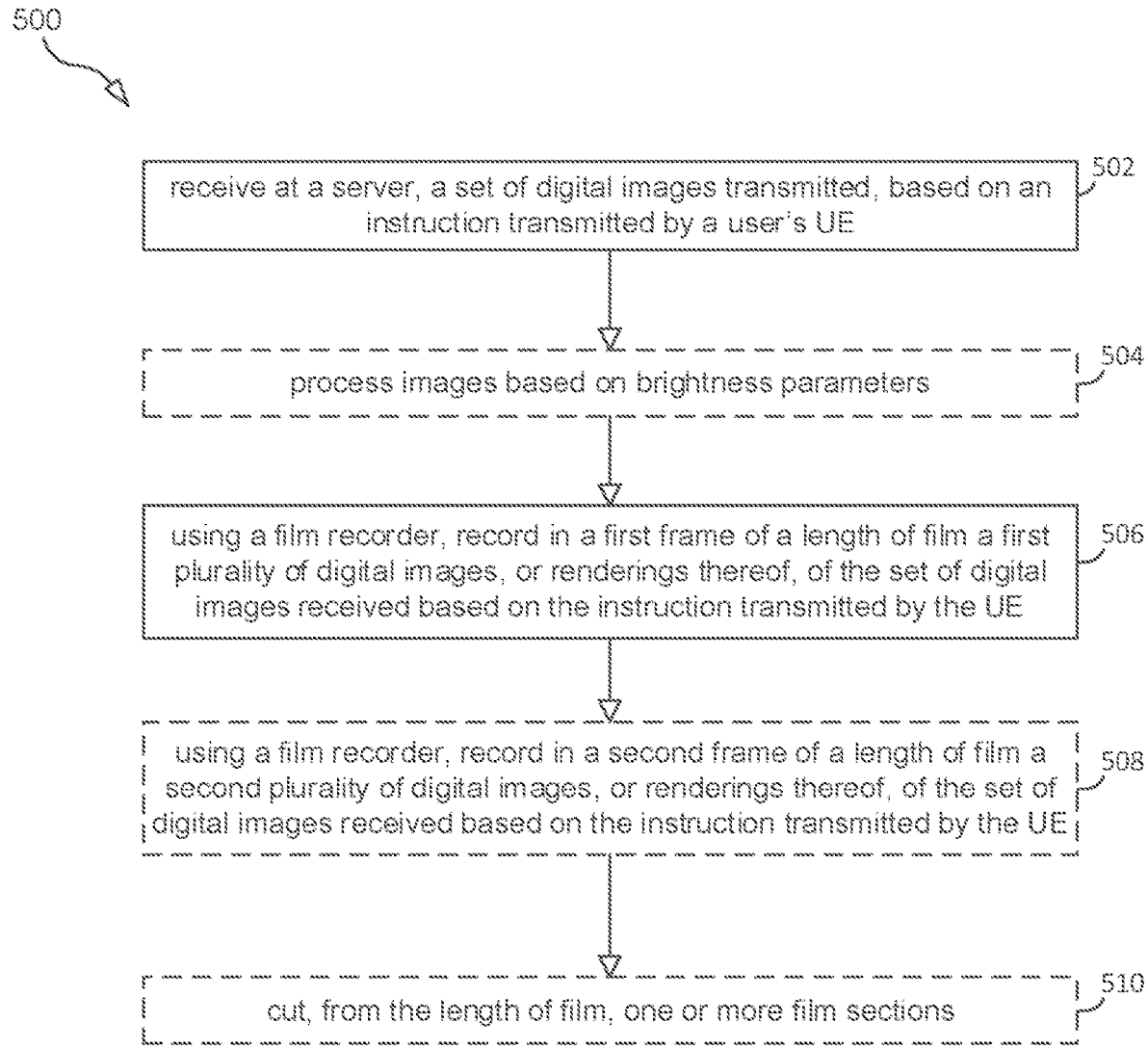
FIG. 5 shows another exemplary method 500 for recording personalized images.

FIG. 5 shows another exemplary method 500 for recording personalized images. In step 502, a set of digital images may be received at a server. In some embodiments, the set of digital images may be received based on an instruction transmitted by a user's UE. This may include directly or indirectly uploading the set of images to the server 102 from the UE, transmitting an instruction to the server 102 which then causes the server 102 to obtain the one or more images from another source (e.g., a cloud-based storage system), or transmitting an instruction to another system (e.g., a cloud-based storage system, or a third party website to which the user has uploaded images or which is otherwise in possession of images in which the user is interested) which may transmit the one or more images to the server 102.

In step 504, the received images optionally be processed based on brightness and/or other parameters, as described above with respect to FIG. 4.

In step 506, a first plurality of digital images, or renderings thereof (e.g., a composite image), of the set of digital images received based on the instruction transmitted by the UE may be recorded in a first frame of a length of film. In step 508, a second plurality of digital images, or renderings thereof (e.g., a composite image), of the set of digital images received based on the instruction transmitted by the UE may optionally be recorded in a second frame of a length of film. Additional images or renderings associated with the UE may be recorded in subsequent frames of the length of film. Further, other frames of the length of film may be used to record images or renderings associated with other users and/or UEs.

In step 510, one or more film sections may optionally be cut from the length of film, as described above with respect to FIGS. 1 and 4. This process may thus produce any number of film sections which may each include renderings of images (or image derivatives) stored on the UE.

FIG. 6 shows an exemplary film-based personalized image projection system 600. In some embodiments, the system 600 may include a UE 610, a projector 620, and one or more slides 630*a*, 630*b*.

In some embodiments, the UE 610 may be any computing device associated with a user. For example, a UE may be a smartphone, computer, microprocessor, ASIC, virtual machine, or any other computing device. The UE 610 may include one or more processors and one or more memories. In some embodiments, the UE 610 may store a plurality of digital images 611-618. In other embodiments, the UE 610 may instead store derivatives of the digital images 611-618. For example, the UE 610 may store low-resolution versions of the original images, whereas the full-resolution versions may be stored in a cloud-based storage system.

In some embodiments, the system may include one or more slides 630*a*, 630*b*. The slides may include renderings of images (or image derivatives) stored on the UE. As used herein, references to a digital image stored on a UE include cases in which a derivative of the image (e.g., a low-resolution version of the image, or a link or pointer to the image)—rather than the image itself—is stored on the UE. For example, a first slide 630*a* may include renderings 611', 612', 613', 614' of images 611, 612, 613, 614. A second slide 630*b* may include renderings 615', 616', 617', 618' of images 615, 616, 617, 618. In some embodiments, the renderings may be arranged in circular arrangements, as described above with respect to FIG. 3. The slides may further include fittings 632, which may help to ensure alignment between an image recorded on the slide and a light path of a projector.

In some embodiments, the system may include a projector 620. The projector may include a light source 622 and a receptacle 626 configured to receive one or more slides, such as slides 630*a*, 630*b*. The receptacle 626 may include one or more fittings that are complementary to fittings 632 on the slides. For example, the slides may have recesses while the receptacle 626 has protrusions, or vice-versa. The complementary fittings may be arranged such that they engage one-another when an image of the slide is properly aligned with a light path of the projector 620. The slides 630*a*, 630*b* may be rotatable within the receptacle 626 so that an image of the slide may be selectively projected by the projector 620. For example, when rendering 611' is selectively placed in the light path of the projector 620, the projector 620 may produce a projected image 611" on a nearby surface, such as a wall. The projected image 611" may be a rendering of an image 611 (or derivative thereof) that is stored on the UE. A user may then rotate the slide 630*a* within the receptacle 626 to selectively align rendering 612' in the light path, which will then produce a projected image corresponding to image 612. Any number of images can be selectively projected in this fashion. Likewise, any number of slides having different images may be provided.

While the subject matter of this disclosure has been described and shown in considerable detail with reference to certain illustrative embodiments, including various combinations and sub-combinations of features, those skilled in the art will readily appreciate other embodiments and variations and modifications thereof as encompassed within the scope of the present disclosure. Moreover, the descriptions of such embodiments, combinations, and sub-combinations is not intended to convey that the claimed subject matter requires features or combinations of features other than those expressly recited in the claims. Accordingly, the scope of this disclosure is intended to include all modifications and variations encompassed within the spirit and scope of the following appended claims.

The invention claimed is:

1. A system for recording personalized digital images on film, the system comprising:
    a length of film;
    a film recorder configured to transfer digital images to photographic film;
    a server configured to receive a plurality of sets of digital images, each set of digital images being associated with a respective user, the plurality of sets of digital images comprising a first set of digital images associated with a first user and a second set of digital images associated with a second user; and
    wherein the system is configured to:
        generate, using at least a first image and a second image of the first set of digital images associated with the first user, a first combined image that comprises a reduced-size version of the first image and a reduced-size version of the second image of the first set of digital images associated with the first user, wherein generating the first combined image comprises:
            reducing a size of the first image of the first set and placing the reduced-size version of the first image of the first set at a first position in the first combined image that overlaps a circular arrangement in the first combined image; and
            reducing a size of the second image of the first set and placing the reduced-size version of the second image of the first set at a second position in the first combined image that overlaps the circular arrangement in the first combined image;
        generate, using at least a first image a second image of the second set of digital images associated with the second user, a second combined image that comprises a reduced-size version of the first image and a reduced-size version of the second image of the second set of digital images associated with the second user, wherein generating the second combined image comprises:
            reducing a size of the first image of the second set and placing the reduced-size version of the first image of the second set at a first position in the second combined image that overlaps a circular arrangement in the second combined image; and
            reducing a size of the second image of the second set and placing the reduced-size version of the second image of the second set at a second position in the second combined image that overlaps a circular arrangement in the second combined image;
        using the film recorder, record in a first frame of the length of film the first combined image comprising the reduced-sized versions of the first image and the second image of the first set of digital images associated with the first user;
        using the film recorder, record in a second frame of the length of film the second combined image comprising the reduced-sized versions of the first image and the second image of the second set of digital images associated with the second user;
        wherein, after the film recorder has recorded at least the first combined image and the second combined image, the length of film comprises a plurality of frames, wherein each frame of the plurality of frames comprises a respective combined image generated based on images received by the server and associated with a respective user, and at least two frames of the plurality of frames comprise respective combined images generated based on images associated with respective users that are different from one-another.

2. The system of claim 1, wherein the system is further configured to:
    for each of a plurality of users from whom a set of digital images is received by the server, generate a respective combined image comprising respective renderings of two or more digital images of the respective set of digital images associated with the respective user, the respective renderings being arranged in respective circular arrangements; and
    using the film recorder, record in a respective frame of the length of film the respective combined image.

3. The system of claim 1, wherein the system is further configured to:
    cut a first film section from the first frame of the length of film, the first film section being configured to selectively project, when used in a first projector, renderings of the one or more digital images of the first set of digital images associated with the first user; and
    cut a second film section from the second frame of the length of film, the second film section being configured to selectively project, when used in a second projector, renderings of the one or more digital images of the second set of digital images associated with the second user.

4. The system of claim 3, wherein the first film section is configured to selectively project, when used in the first projector, renderings of at least two images of the one or more digital images of the first set of digital images associated with the first user;
    wherein the renderings of the at least two images of the one or more digital images of the first set of digital images associated with the first user are arranged in a first circular arrangement such that the first user may rotate the first film section relative to the first projector to select between images.

5. The system of claim 2, wherein the system is further configured to:
    for each respective frame of the length of film, cut a respective film section, the respective film section being configured to selectively project the renderings of the two or more digital images of the respective combined image recorded in the respective frame.

6. The system of claim 3, wherein the system is further configured to:
    process, based at least in part on a first brightness parameter, the digital images of the first set of digital images associated with the first user;

process, based at least in part on a second brightness parameter, the digital images of the second set of digital images associated with the second user;

wherein the first brightness parameter is selected to optimize the selectively projectable renderings of the one or more digital images of the first set of digital images based, at least in part, on a first exposure parameter to which the first film section is subjected;

wherein the second brightness parameter is selected to optimize the selectively projectable renderings of the one or more digital images of the second set of digital images based, at least in part, on a second exposure parameter to which the second film section is subjected.

7. The system of claim 6, wherein the system is configured to use a uniform exposure parameter for each of the plurality of frames of the length of film, the first and second brightness parameters being identical to the uniform exposure parameter.

8. A film-based personalized image system, the system comprising:

a user equipment (UE);

a projector comprising a light source; and a film section configured to be disposed within the projector such that one or more projected images may be projected by passing light from the light source through the film section;

wherein the film section was produced by:

transmitting, using the UE, an instruction which causes a server to receive a first set of digital images associated with a first user to a server;

generating, using at least a first image and a second image of the first set of digital images associated with the first user, a first combined image that comprises a reduced-size version of the first image and a reduced-size version of the second image of the first set of digital images associated with the first user, wherein generating the first combined image comprises:

reducing a size of the first image of the first set and placing the reduced-size version of the first image of the first set at a first position in the first combined image that overlaps a circular arrangement in the first combined image; and reducing a size of the second image of the first set and placing the reduced-size version of the second image of the first set at a second position in the first combined image that overlaps the circular arrangement in the first combined image;

using a film recorder, recording in a first frame of a length of film the first combined image comprising the reduced-sized versions of the first image and the second image of the first set of digital images;

using the film recorder, recording in a second frame of a length of film a second combined image comprising reduced-sized versions of a first image and a second image of a second set of digital images associated with a second user;

wherein, after the film recorder has recorded at least the first combined image and the second combined image, the length of film comprises a plurality of frames, wherein each frame of the plurality of frames comprises a respective combined image generated based on images received by the server and associated with a respective user, and at least two frames of the plurality of frames comprise respective combined images generated based on images associated with respective users that are different from one-another.

9. The system of claim 8, wherein film section comprises renderings of a plurality of digital images, or derivatives thereof, stored in the UE.

10. The system of claim 8, wherein the film section is rotatable within the projector to selectively project the one or more projected images, the one or more projected images comprising at least two projected images.

11. The system of claim 8, wherein the film section is configured to selectively project, when used in the projector, renderings of at least two images of the one or more digital images of the first set of digital images associated with the first user;

wherein the renderings of the at least two images of the one or more digital images of the first set of digital images associated with the first user are arranged in the circular arrangement such that the first user may rotate the film section relative to the projector to select between images.

12. A film-based personalized image projection system, the system comprising:

a user equipment (UE);

a projector comprising a light source;

a first film section configured to be disposed within the projector such that a first plurality of projected images may be selectively projected by passing light from the light source through the first film section;

the first film section comprising reduced-size versions of a first plurality of digital images;

a second film section configured to be disposed within the projector such that a second plurality of projected images may be selectively projected by passing light from the light source through the second film section;

the second film section comprising reduced-sized versions of a second plurality of digital images;

wherein the first film section and the second film section were produced using a manufacturing method comprising:

transmitting, using the UE, an instruction which causes a server to receive a set of digital images comprising the first plurality of digital images; and generating, using at least a first image and a second image of the first plurality of digital images, a first combined image that comprises reduced-size versions of the first and second images of the first plurality of digital images, wherein generating the first combined image comprises:

reducing a size of the first image of the first plurality of digital images and placing the reduced-size version of the first image of the first plurality of digital images at a first position in the first combined image that overlaps a circular arrangement in the first combined image; and reducing a size of the second image of the first plurality of digital images and placing the reduced-size version of the second image of the first plurality of digital images at a second position in the first combined image that overlaps the circular arrangement in the first combined image;

generating, using at least a first image and a second image of the second plurality of digital images, a second combined image that comprises reduced-size versions of the first and second images of the second plurality of digital images, wherein generating the second combined image comprises:

reducing a size of the first image of the second plurality of digital images and placing the reduced-size version of the first image of the second plurality of digital images at a first position in the second combined image that overlaps a circular arrangement in the second combined image; and reducing a size of the second image of the second plurality of digital images and placing the reduced-size version of the second image of the second plurality of digital images at a second position in the second combined image that overlaps the circular arrangement in the second combined image;

using a film recorder, recording in a first frame of a length of film the first combined image comprising the reduced-sized versions of the first image and the second image of the first plurality of digital images received based on the instruction transmitted using the UE; and using the film recorder, recording in a second frame of the length of film the second combined image comprising the reduced-sized versions of the first image and the second image of the second plurality of digital images, wherein the set of digital images received based on the instruction transmitted using the UE includes the second plurality of digital images.

13. The system of claim 12, wherein the first film section is rotatable within the projector to selectively project the first plurality of projected images.

14. The system of claim 12, wherein the manufacturing method used to produce the first film section further comprises:
processing, based at least in part on a brightness parameter, the digital images of the first plurality of digital images;
wherein the brightness parameter is selected to optimize the first plurality of projected images based, at least in part, on an exposure parameter to which the first film section is subjected.

15. The system of claim 12, wherein the manufacturing method used to produce the first film section and the second film section further comprises:
processing, based at least in part on a first brightness parameter, the digital images of the first plurality of digital images;
processing, based at least in part on a second brightness parameter, the digital images of the second plurality of digital images;
wherein the first brightness parameter is selected to optimize the first plurality of projected images based, at least in part, on a first exposure parameter to which the first film section is subjected; and
the second brightness parameter is selected to optimize the second plurality of projected images based, at least in part, on a second exposure parameter to which the second film section is subjected.

16. The system of claim 15, wherein the first and second exposure parameters are identical.

17. The system of claim 12, wherein the first plurality of digital images, or derivatives thereof, is stored in the UE.

* * * * *